United States Patent [19]

Hill et al.

[11] Patent Number: 5,205,502
[45] Date of Patent: Apr. 27, 1993

[54] AVIATION ELECTRONICS INSTRUMENT LATCHING SWING HANDLE

[75] Inventors: Richard T. Hill, Marion; Roger W. Heidt, Robins, both of Iowa

[73] Assignee: Rockwell International Corporation, Seal Beach, Calif.

[21] Appl. No.: 766,469

[22] Filed: Sep. 26, 1991

[51] Int. Cl.⁵ .............. G01D 11/24; G01L 19/14; G01P 1/02; G12B 9/10
[52] U.S. Cl. .................. 244/1 R; 73/431; D12/192; 248/27.1
[58] Field of Search ........... 244/1 R, 118.5, 129.1; 73/431, 432 AD; 248/27.1; 312/7.2; D12/192; 16/114 R; 292/175

[56] References Cited

U.S. PATENT DOCUMENTS

| | | | |
|---|---|---|---|
| D. 223,404 | 4/1972 | Schwartz | D12/192 |
| 3,746,931 | 7/1973 | Muranaka | 248/27.1 |
| 3,877,763 | 4/1975 | Broghammer | 248/27.1 |
| 4,061,370 | 12/1977 | Hauber | 292/175 |
| 4,553,353 | 11/1985 | Simpson | 292/175 |
| 4,587,391 | 5/1986 | Harper | 248/27.1 |
| 4,881,295 | 11/1989 | Odemer | 248/27.1 |
| 4,947,661 | 8/1990 | Yoshida | 248/27.1 |

FOREIGN PATENT DOCUMENTS 1490356 12/1968 Fed. Rep. of Germany ..... 248/27.1

*Primary Examiner*—Joseph F. Peters, Jr.
*Assistant Examiner*—Virna Lissi Ansley
*Attorney, Agent, or Firm*—Gregory G. Williams; M. Lee Murrah; H. Fredrick Hamann

[57] ABSTRACT

An improved mounting and carrying assembly for avionics displays including a swing handle with edge mounted sliding spring latches thereon for cooperating with holding pins disposed on a side of the display bezel that is not the front or viewing side.

3 Claims, 2 Drawing Sheets

AVIATION ELECTRONICS INSTRUMENT LATCHING SWING HANDLE

FIELD OF THE INVENTION

The present invention relates to aircraft instruments and more particularly to instrument panels in aircraft with panel end installation capabilities and even more particularly concerns panel end loaded aircraft instruments with rectangular viewing surfaces and with swing handles thereon.

BACKGROUND OF THE INVENTION

In the past, swing handles have typically been screwed to a corner piece of the bezel. (See FIG. 1) When instruments were typically round faced, ample room was available on the face of the instrument panel for mounting screws. But, with Cathode Ray Tubes (CRT's) and much more as with rectangular flat panel Liquid Crystal Displays (LCD's) the instrument is more extensively filled with the viewing surface. Nevertheless, the use of screws to attach the instrument to the instrument panel persists. This has required the consumption of valuable space on the viewing surface and has required the use of tools during the installation process.

Consequently, there exists a need for improvement in swing handles for avionics displays.

SUMMARY OF THE INVENTION

It is an object of the present invention to allow for an enlargement of the viewing surface of a display without requiring an enlargement of the display itself.

It is a feature of the present invention to provide an edge mounted and affixed swing handle.

It is an advantage of the present invention to eliminate the handle retaining screws often associated with securing the handle to the front corners of the bezel.

It is a further object of the present invention to provide for easier insertion and removal of avionics displays.

It is a further feature of the present invention to include sliding latches on the swing handle.

It is a further advantage of the present invention to allow for insertion and or removal of the display without using tools.

The present invention is designed to satisfy the aforementioned needs, fulfill the previously propounded objects including the above described features and achieve the earlier articulated advantages. The present invention is carried out in a "screw-less" and a "curved corner-less" fashion in the sense that the handle retaining screws and the curved corner pieces have been eliminated. Instead, an edge mounted latch is used.

Accordingly, the present invention includes an advanced avionics display mounting and carrying assembly, including an edge mounted swing handle with an edge mounted latch thereon.

BRIEF DESCRIPTION OF THE DRAWINGS

The present invention may be more fully understood by a reading of the detailed description in conjunction with th appended drawings, in which.

DETAILED DESCRIPTION

Figure 1:
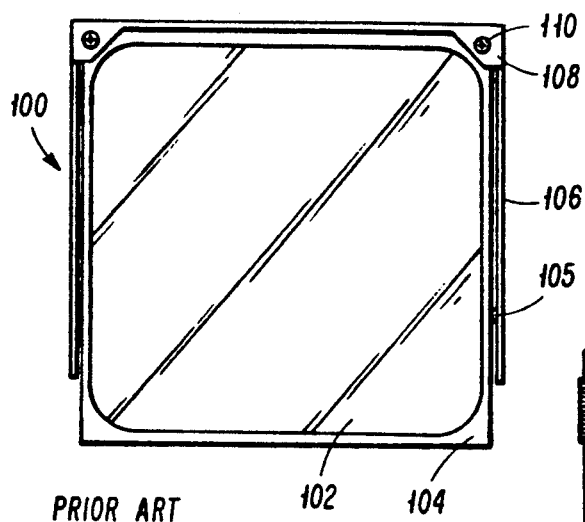
FIG. 1 is a front view of an instrument and mounting assembly of the prior art.

Now referring to the Figures, where like numerals therein refer to like numerals, text and matter in the specification and the Figures. Referring more particularly to FIG. 1, there is shown an avionics display device and mounting assembly, of the prior art, generally designated 100, having a viewing surface 102, a bezel 104, a swing handle 106, with a pivoting screw 105. The swing handle 106 is shown affixed to the face of the bezel 104 at a curved corner area 108 by handle retaining screws 110. The curved corner areas 108 result in a reduction in the overall viewing area of the display surface 102, while the handle retaining screws 110 require the use of tools.

Figure 2:
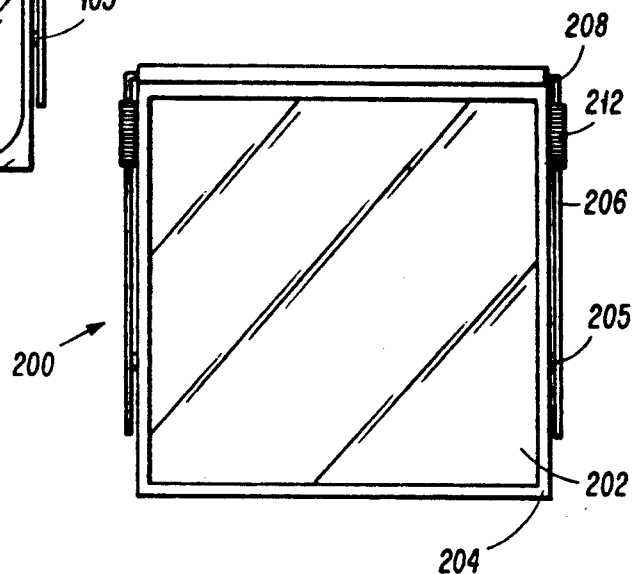
FIG. 2 is a front view of an instrument and mounting assembly of the present invention.

Now referring to FIG. 2, there is shown an avionics display device, of the present invention, generally designated 200, which includes a viewing surface 202, a bezel 204, a swing handle 206, with a pivoting screw 205, and a sliding latch assembly 212, disposed near top corner 208 of swing handle 206. It can be clearly seen by comparison that the viewing surface 202 has a larger surface area than the viewing surface 102 (FIG. 1). The elimination of the screws in the corners allows for more rectangular shape viewing surfaces.

Figure 3:
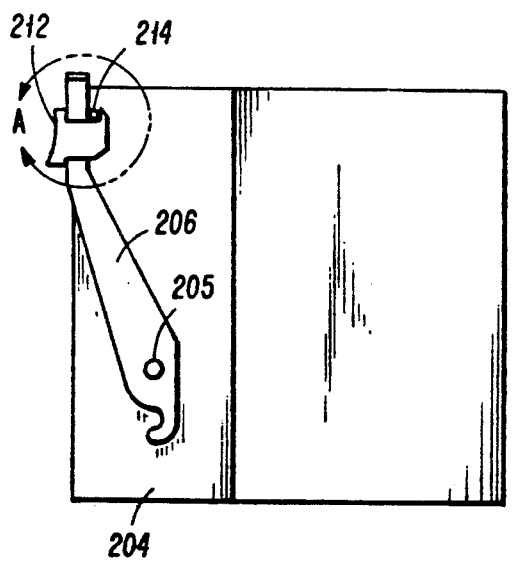
FIG. 3 is a side view of the instrument and mounting assembly of the present invention, showing the latch, the pivoting screw and the holding pin.

Now referring to FIG. 3, there is shown a side view of the display 200 of FIG. 2, which more clearly shows swing handle 206, latch assembly 212, pivoting screw 205 and also shows holding pin 214, which is preferably affixed to the bezel.

Figure 4:
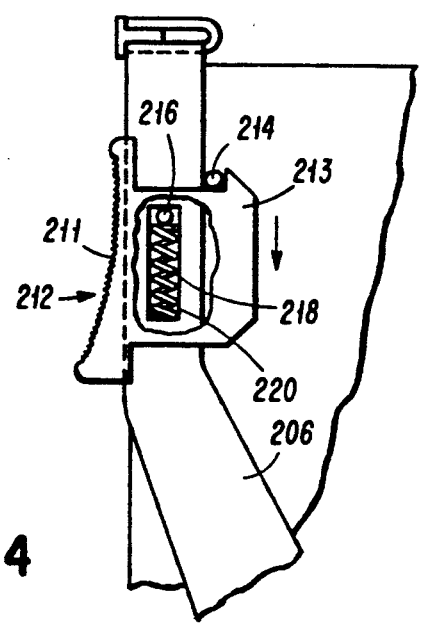
FIG. 4 is an enlarged cut away view of the latch assembly of the present invention.

Now referring to FIG. 4, there is shown a cut away view of the latch assembly 212, of FIG. 2, which shows finger grip member 211, attached to latch plate 213. A portion of latch plate 213 is cut away to reveal the latch spring 218, disposed in a rectangular slot 220 in swing handle 206, at the top of spring 218, latch pin 216 is shown disposed in slot 220. The latch assembly 212 is shown in the latched position with latch plate 213 disposed against holding pin 214.

Figure 5:
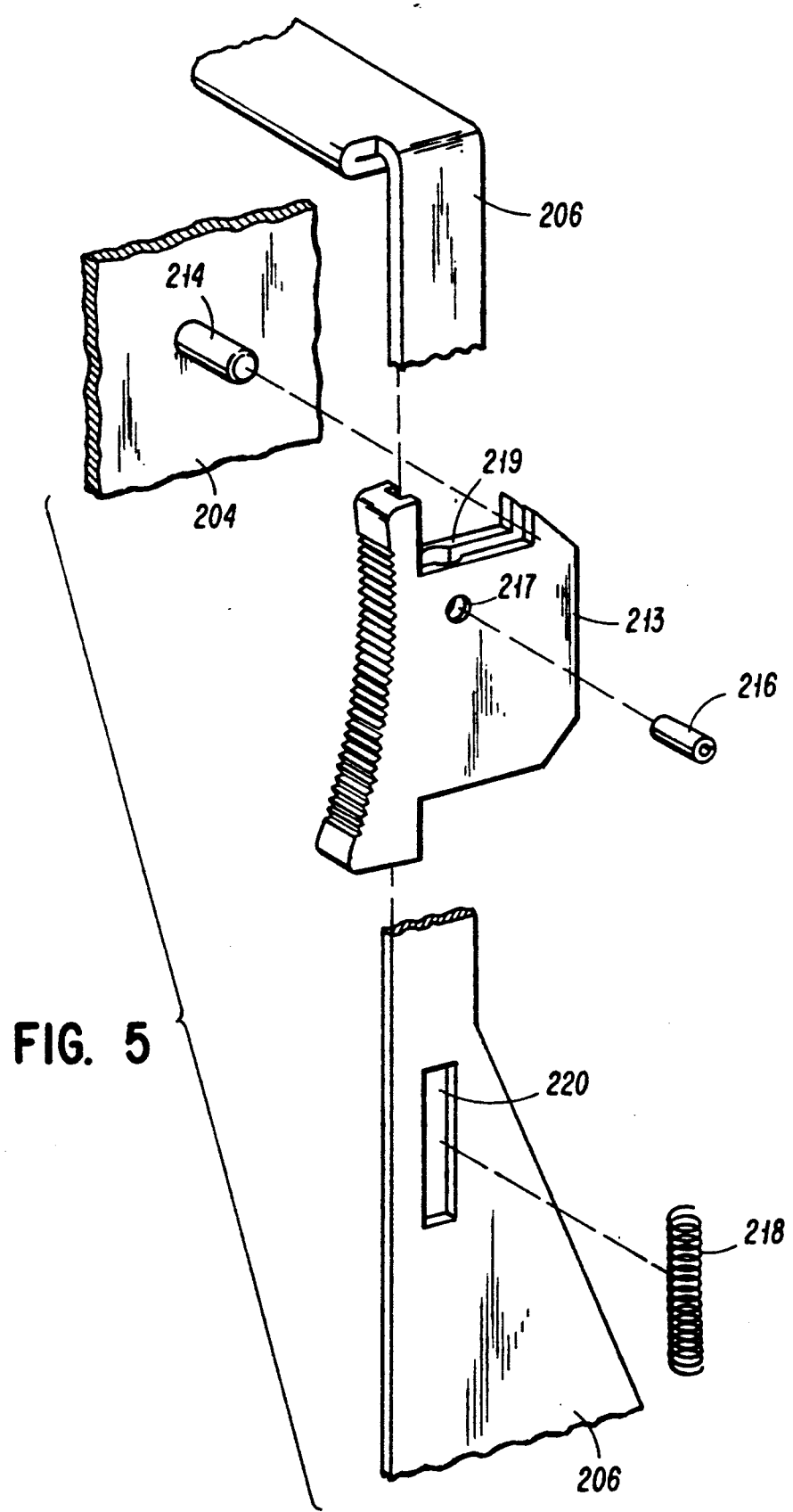
FIG. 5 is an exploded view of the latch assembly of the present invention.

Now referring to FIG. 5, there is shown an exploded view of the latch assembly 212, together with the holding pin 214 and the swing handle 206. Latch pin 216 is shown disposed in the latch pin receiving hole 217 in latch plate 213. Also shown is latch plate spring cylinder 219 formed in latch plate 213. Spring cylinder 219 prevents rotation of the latch plate 213 because the spring 218 is captive in the cylinder 219.

FIGS. 2-5 all show display instruments and mounting assemblies with the latch members on the side of the display and swing handle. It is a matter of designers choice as to whether the latches are on the sides of the swing handle or on the top of the swing handle. It is contemplated that the invention shown in the Figures can be configured for a top latch assembly.

It is thought that the display and mounting assembly of the present invention and many of its attendant advantages will be understood from the foregoing description and it will be apparent that various changes may be made to the form construction and arrangement of the parts thereof. Without departing from the spirit and scope of the invention or sacrificing all of its material advantages, the form herein before described being a preferred or exemplary embodiment thereof. It is the intention of the appended claims to cover all such changes.

We claim:

1. An improved avionics display instrument mounting assembly comprising:
   a bezel, disposed about a display instrument for providing an exterior surface of the instrument, the bezel having a first side, a second side, a third side, a fourth side, and a front side;
   a swing handle pivotally disposed on said bezel, the handle having a first side, a second side, and a third side;
   a swing handle holding pin disposed on said first side of said bezel;
   said swing handle having a sliding latch thereon; and
   said swing handle being pivotally mounted, so that, when said swing handle is pivoted across the front side of the bezel said sliding latch engages with said swing handle holding pin thereby attaching said swing handle to said bezel.

2. An avionics mounting assembly for mounting to an avionics display having a right display side, a left display side, a top display side and a front display side; the mounting assembly comprising:
   a "U" shaped pivoting handle, having a right handle side, a left handle side, and a top handle side;
   said right handle side and said left handle side being pivotally attached to said right display side and said left display side;
   a right display side pin disposed on the right display side of the display;
   a left display side pin disposed on the left display side of the display;
   said right handle side having a spring loaded sliding latch member thereon for attachment with said right display side pin; and
   said left handle side having a spring loaded sliding latch member thereon for attachment with said left display side pin.

3. An improved display and mounting assembly comprising;
   a generally rectangular shaped avionics display device, having a rectangular shaped viewing surface thereon, also having a right display side, a left display side, a top display side, a bottom display side, and a front display side;
   a "U" shaped swing handle, having a right handle side, a left handle side and a top handle side, said right handle side being pivotally attached to said right display side and said left handle side being pivotally attached to said left display side, so that said top handle side can be pivoted from a position adjacent said top display side to a position adjacent to said front display side;
   said right display side having a right holding pin disposed thereon;
   said left display side having a left holding pin disposed thereon,
   said right handle side having a right spring receiving slot therein and having slidably attached thereto a right latch plate having a hole there through for receiving a latch pin;
   said latch plate being capable of translational motion along said right handle side;
   said left handle side having a left spring receiving slot therein and further having a left latch plate slideably disposed along the left handle side;
   said left latch plate having a left pin receiving hole therein; and,
   said left latch plate being capable of translational motion along the left handle side;
   whereby the right latch plate is spring biased against the right holding pin when the top handle side is disposed adjacent the top display side and the left latch plate is spring biased against the left holding pin; thereby creating attachment between the right handle side, the left handle side, the right display side and the left display side.

* * * * *